United States Patent
Ishida et al.

(10) Patent No.: US 10,703,636 B2
(45) Date of Patent: Jul. 7, 2020

(54) COMPOSITE POLYCRYSTAL AND METHOD FOR MANUFACTURING THE SAME

(71) Applicant: Sumitomo Electric Industries, Ltd., Osaka-shi (JP)

(72) Inventors: Yuh Ishida, Itami (JP); Takeshi Sato, Itami (JP); Hitoshi Sumiya, Itami (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 266 days.

(21) Appl. No.: 15/535,613

(22) PCT Filed: Oct. 4, 2016

(86) PCT No.: PCT/JP2016/079418
§ 371 (c)(1),
(2) Date: Jun. 13, 2017

(87) PCT Pub. No.: WO2017/073257
PCT Pub. Date: May 4, 2017

(65) Prior Publication Data
US 2017/0349441 A1     Dec. 7, 2017

(30) Foreign Application Priority Data
Oct. 30, 2015 (JP) .................. 2015-214098

(51) Int. Cl.
*C01B 32/25* (2017.01)
*B01J 3/06* (2006.01)
(Continued)

(52) U.S. Cl.
CPC ............... *C01B 32/25* (2017.08); *B01J 3/062* (2013.01); *C01B 32/26* (2017.08); *C04B 35/522* (2013.01);
(Continued)

(58) Field of Classification Search
CPC ....... C01B 32/25; C01B 32/26; C04B 35/645; C04B 35/528; C04B 35/522;
(Continued)

(56) References Cited

U.S. PATENT DOCUMENTS 3,816,085 A * 6/1974 Hall ........................ B01J 3/06
51/307
2009/0305039 A1   12/2009 Sumiya
(Continued)

FOREIGN PATENT DOCUMENTS

JP    H09-142933 A    6/1997
JP    2003-292397 A   10/2003
(Continued)

*Primary Examiner* — Laura C Powers
(74) *Attorney, Agent, or Firm* — Baker Botts L.L.P.; Michael A. Sartori

(57) ABSTRACT

A composite polycrystal includes: a polycrystalline diamond phase including a plurality of diamond particles; and non-diamond phases composed of non-diamond carbon. The non-diamond phases are distributed in the polycrystalline diamond phase. An average value of projected area equivalent circle diameters of the non-diamond phases is not more than 1000 nm.

5 Claims, 4 Drawing Sheets

(51) Int. Cl.
  *C04B 35/645* (2006.01)
  *C04B 35/32* (2006.01)
  *C04B 35/528* (2006.01)
  *C01B 32/26* (2017.01)
  *C04B 35/52* (2006.01)

(52) U.S. Cl.
  CPC .......... *C04B 35/528* (2013.01); *C04B 35/645* (2013.01); *B01J 2203/0625* (2013.01); *B01J 2203/0655* (2013.01); *C01P 2004/90* (2013.01); *C01P 2006/90* (2013.01); *C04B 2235/425* (2013.01); *C04B 2235/428* (2013.01); *C04B 2235/5436* (2013.01); *C04B 2235/5445* (2013.01); *C04B 2235/604* (2013.01); *C04B 2235/608* (2013.01); *C04B 2235/661* (2013.01); *C04B 2235/72* (2013.01); *C04B 2235/80* (2013.01)

(58) Field of Classification Search
  CPC ........ C04B 2235/608; C04B 2235/604; C04B 2235/5445; C04B 2235/5436; C04B 2235/428; C04B 2235/425; C04B 2235/72; B01J 3/062; B01J 2203/0655; B01J 2203/0625; C01P 2006/90; C01P 2004/90
  See application file for complete search history.

(56) References Cited

U.S. PATENT DOCUMENTS

| | | |
|---|---|---|
| 2010/0146865 A1 | 6/2010 | Sato et al. |
| 2017/0050886 A1 | 2/2017 | Satoh et al. |

FOREIGN PATENT DOCUMENTS

| | | |
|---|---|---|
| JP | 2005-239472 A | 9/2005 |
| JP | 2011-190124 A | 9/2011 |
| WO | 2007/011019 A1 | 1/2007 |
| WO | 2009/099130 A1 | 8/2009 |
| WO | 2015/166730 A1 | 11/2015 |

\* cited by examiner

COMPOSITE POLYCRYSTAL AND METHOD FOR MANUFACTURING THE SAME

TECHNICAL FIELD

The present disclosure relates to a composite polycrystal and a method for manufacturing the same.

The present application claims priority to Japanese Patent Application No. 2015-214098 filed on Oct. 30, 2015, the entire contents of which are hereby incorporated by reference.

BACKGROUND ART

Japanese Patent Laying-Open No. 2003-292397 (PTD 1) and International Publication No. 2009/099130 (PTD 2) disclose polycrystalline diamond manufactured by directly converting graphite to polycrystalline diamond without addition of a sintering aid, a catalyst and the like.

Japanese Patent Laying-Open No. 9-142933 (PTD 3) and Japanese Patent Laying-Open No. 2005-239472 (PTD 4) disclose polycrystalline diamond including polycrystalline diamond and a component such as metal carbide or metal oxide.

CITATION LIST

Patent Document

PTD 1: Japanese Patent Laying-Open No. 2003-292397
PTD 2: International Publication No. 2009/099130
PTD 3: Japanese Patent Laying-Open No. 9-142933
PTD 4: Japanese Patent Laying-Open No. 2005-239472

SUMMARY OF INVENTION

A composite polycrystal of the present disclosure includes: a polycrystalline diamond phase including a plurality of diamond particles; and non-diamond phases composed of non-diamond carbon. The non-diamond phases are distributed in the polycrystalline diamond phase. An average value of projected area equivalent circle diameters of the non-diamond phases is not more than 1000 nm.

A method for manufacturing a composite polycrystal of the present disclosure includes:
preparing non-diamond carbon;
pressurizing the non-diamond carbon to a sintering pressure and heating the non-diamond carbon to a sintering temperature under a condition satisfying all of following equations (I) to (IV):

$$P \leq 0.0067T + 1 \quad \text{(I)};$$

$$P \geq 0.0035T - 0.3462 \quad \text{(II)};$$

$$0 \leq T \leq 2700 \quad \text{(III); and}$$

$$0 \leq P \leq 13 \quad \text{(IV)}$$

where P [GPa] represents a pressure and T [° C.] represents a temperature,
the sintering pressure being not less than 9 GPa and not more than 13 GPa, and the sintering temperature being not lower than 1800° C. and not higher than 2700° C.; and
keeping the non-diamond carbon at the sintering pressure and the sintering temperature, thereby converting a part of the non-diamond carbon to polycrystalline diamond and sintering the non-diamond carbon and the polycrystalline diamond, to manufacture the composite polycrystal.

DESCRIPTION OF EMBODIMENTS

Figure 1:
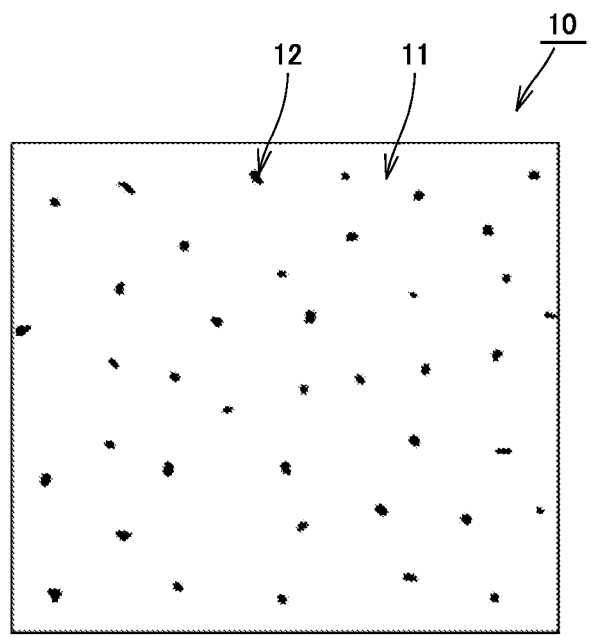
FIG. 1 is a schematic view showing a structure of a composite polycrystal according to one embodiment of the present disclosure.

Problems to be Solved by the Present Disclosure

Conventionally, cutting tools, wear-resistant tools and the like taking advantage of the hardness of diamond have been developed. The polycrystalline diamond disclosed in PTDs 1 and 2 does not contain a sintering aid (e.g., cobalt) and thus the purity of diamond is high. According to PTD 1, the polycrystalline diamond exhibits a hardness equivalent to that of monocrystalline diamond, and further, it is more difficult to cleave the polycrystalline diamond than monocrystalline diamond.

On the other hand, in PTDs 3 and 4, a sintering aid is under study. According to these documents, the use of a particular sintering aid (such as metal carbide or metal oxide) leads to an increase in wear resistance and the like of the polycrystalline diamond.

However, an increase in chipping resistance has been particularly desired in applications in which impact and vibration are applied to a cutting edge of a tool during processing, e.g., an excavating tool such as an excavating bit as well as a wear-resistant tool such as a scribing wheel.

Accordingly, an object of the present disclosure is to provide a composite polycrystal having an increased chipping resistance.

Description of Embodiment of the Present Disclosure

First, an embodiment of the present disclosure will be listed and described.

[1] A composite polycrystal according to one aspect of the present disclosure includes: a polycrystalline diamond phase including a plurality of diamond particles; and non-diamond phases composed of non-diamond carbon. The non-diamond phases are distributed in the polycrystalline diamond phase. An average value of projected area equivalent circle diameters of the non-diamond phases is not more than 1000 nm.

The above-described composite polycrystal is not a single-phase polycrystal but a composite polycrystal (composite polycrystalline diamond) including the polycrystalline diamond phase and the non-diamond phases. The non-diamond phases are composed of non-diamond carbon such as, for example, graphite and amorphous carbon. The non-diamond phases are fine-particle phases in which the average value of the projected area equivalent circle diameters of the non-diamond phases is not more than 1000 nm, and are distributed in the polycrystalline diamond phase.

The composite polycrystal having such a structure has an increased chipping resistance. Although the details of the mechanism are not clear at the present time, it is estimated that the non-diamond phases finely distributed in the structure mitigate impact and stress. However, when the average value of the projected area equivalent circle diameters of the non-diamond phases exceeds 1000 nm, the non-diamond phases having a relatively low strength in the structure are likely to serve as a starting point of breaking, and thus, the chipping resistance decreases.

Furthermore, the above-described composite polycrystal may be composite polycrystalline diamond that does not substantially contain a metal component derived from a sintering aid or a binder. If the metal component derived from the sintering aid or the like exists in the polycrystalline diamond structure, the chipping resistance may decrease due to thermal expansion of the metal component. The above-described composite polycrystal does not substantially contain the metal component, and thus, an increase in chipping resistance can be expected.

[2] The average value of the projected area equivalent circle diameters of the non-diamond phases may be not more than 100 nm. As a result, an increase in chipping resistance can be expected.

[3] An average value of projected area equivalent circle diameters of the diamond particles may be not more than 1000 nm. As a result, an increase in chipping resistance can be expected.

[4] A Knoop hardness of the composite polycrystal may be not less than 50 GPa. As a result, an increase in wear resistance can be expected.

[5] A composite polycrystal according to one aspect of the present disclosure includes: a polycrystalline diamond phase including a plurality of diamond particles; and non-diamond phases composed of non-diamond carbon. The non-diamond phases are distributed in the polycrystalline diamond phase. An average value of projected area equivalent circle diameters of the non-diamond phases is not more than 100 nm. An average value of projected area equivalent circle diameters of the diamond particles is not more than 1000 nm. A Knoop hardness of the composite polycrystal is not less than 50 GPa. In this composite polycrystal, an increase in chipping resistance is expected.

[6] A method for manufacturing a composite polycrystal according to one aspect of the present disclosure includes:
preparing non-diamond carbon;
pressurizing the non-diamond carbon to a sintering pressure and heating the non-diamond carbon to a sintering temperature under a condition satisfying all of following equations (I) to (IV):

$$P \leq 0.0067T+1 \quad \text{(I)};$$

$$P \geq 0.0035T-0.3462 \quad \text{(II)};$$

$$0 \leq T \leq 2700 \quad \text{(III); and}$$

$$0 \leq P \leq 13 \quad \text{(IV)}$$

where P [GPa] represents a pressure and T [° C.] represents a temperature,
the sintering pressure being not less than 9 GPa and not more than 13 GPa, and the sintering temperature being not lower than 1800° C. and not higher than 2700° C.; and
keeping the non-diamond carbon at the sintering pressure and the sintering temperature, thereby converting a part of the non-diamond carbon to polycrystalline diamond and sintering the non-diamond carbon and the polycrystalline diamond, to manufacture the composite polycrystal.

According to such a manufacturing method, the composite polycrystal of [1] above can be manufactured.

Effects of the Present Disclosure

According to the foregoing, there is provided a composite polycrystal having an increased chipping resistance.

Details of Embodiment of the Present Disclosure

Hereinafter, one embodiment of the present disclosure (hereinafter also denoted as "present embodiment") will be described in detail. However, the embodiment of the present disclosure is not limited to the following description.

<Composite Polycrystal>

FIG. 1 is a schematic view showing a structure of a composite polycrystal of the present embodiment. The crystal structure shown in FIG. 1 can be identified, for example, by observing one surface obtained by polishing a composite polycrystal with a scanning electron microscope (SEM) and the like.

As shown in FIG. 1, a composite polycrystal 10 includes a polycrystalline diamond phase 11 including a plurality of diamond particles, and non-diamond phases 12 composed of non-diamond carbon. Due to a difference in crystal structure and conductivity between these phases, polycrystalline diamond phase 11 is observed as bright field and non-diamond phases 12 are observed as dark field in observation with the SEM.

It is desirable that the composite polycrystal of the present embodiment should substantially include only the polycrystalline diamond phase and the non-diamond phases. Not including a metal component such as a sintering aid or a binder leads to an increase in chipping resistance because thermal expansion of the metal component does not occur. However, the composite polycrystal of the present embodiment may include unavoidable impurities that unavoidably enter the composite polycrystal during manufacturing. As such unavoidable impurities, nitrogen (N) and the like having adsorbed onto a raw material (starting material) are assumed, for example. An amount of the contained unavoidable impurities is desirably less than 1000 ppma (parts per million atomic). The amount of the contained unavoidable impurities can be measured, for example, by secondary ion mass spectrometry (SIMS) and the like.

<<Non-Diamond Phase>>

A plurality of non-diamond phases 12 are included in the composite polycrystal. Non-diamond phases 12 are distributed in polycrystalline diamond phase 11.

"Being distributed" herein refers to a state in which the non-diamond phases exist in an isolated manner and the individual non-diamond phases do not connect to each other in the cross-sectional image shown in FIG. 1. In the present embodiment, in the following case, all of the non-diamond phases included in the composite polycrystal are regarded as "being distributed".

Specifically, the composite polycrystal is polished to thereby expose a clean surface. From this surface, three measurement positions are selected randomly. At each measurement position, a rectangular range of 9 μm in length×12 μm in width is observed at a magnification of 10000. When a connected portion of the non-diamond phases cannot be identified in observation of the rectangular ranges at the three positions, all of the non-diamond phases included in the composite polycrystal are regarded as being distributed.

In the present embodiment, the non-diamond phases are distributed, which leads to an increase in chipping resistance. In contrast, if the connected portion of the non-diamond phases exists in the structure, this portion serves as a starting point of breaking, and thus, the chipping resistance decreases.

The non-diamond phase is composed of non-diamond carbon. "Non-diamond carbon" refers to solid carbon other than diamond. Non-diamond carbon may be, for example, graphite, glassy carbon, amorphous carbon, fullerene, carbon nanotube and the like. Non-diamond carbon forming the non-diamond phase is preferably at least one of graphite and amorphous carbon. The non-diamond phase may be composed of one form or a plurality of forms of monocrystalline, polycrystalline and amorphous. For example, the non-diamond phase may be a composite form in which a single crystal of graphite and amorphous carbon aggregate, and the like.

The non-diamond phase can be identified using SEM observation and X-ray diffraction measurement together. Specifically, in X-ray diffraction of the composite polycrystal including the non-diamond phases, a peak derived from diamond and a peak derived from, for example, graphite are observed. A peak derived from a (111) face, a (220) face, a (331) face or the like may be considered as the peak derived from diamond. A peak derived from a (002) face, a (004) face or the like may be considered as the peak derived from graphite.

In addition to the foregoing, the non-diamond phase can also be identified further using, for example, Raman scattering spectrum measurement with a microscopic Raman spectrometer.

(Average Value of Projected Area Equivalent Circle Diameters of Non-Diamond Phases)

An average value of projected area equivalent circle diameters of the non-diamond phases is not more than 1000 nm. The projected area equivalent circle diameter herein refers to a diameter of a circle having an area equal to that of a two-dimensional projected image of a particulate substance in the cross-sectional image shown in FIG. 1. In measurement of the projected area equivalent circle diameters of the non-diamond phases (and diamond particles described below), an observation magnification of the SEM is 10000× and a visual field range is a rectangular range of 9 μm in length×12 μm in width.

The average value of the projected area equivalent circle diameters of the non-diamond phases can be calculated in accordance with the following procedural steps (a) to (f). The average value herein refers to an arithmetic average value, unless otherwise specified.

(a) First, the number of non-diamond phases in a visual field is counted.

(b) Binarization is performed on the visual field (SEM image) to divide the visual field into pixels derived from a bright field (pixels derived from the polycrystalline diamond phase) and pixels derived from a dark field (pixels derived from the non-diamond phases).

(c) The number of pixels derived from the dark field is counted.

(d) The total number of pixels in the dark field is multiplied by an area per pixel to calculate a total area of the dark field.

(e) The total area of the dark field is divided by the number of non-diamond phases to calculate an average area per non-diamond phase.

(f) A diameter of a circle having an area equal to the average area is determined.

The non-diamond phases in the present embodiment are fine-particle phases in which the average value of the projected area equivalent circle diameters of the non-diamond phases is not more than 1000 nm. Therefore, even when the plurality of non-diamond phases exist in the structure, an influence of the non-diamond phases on the strength of the entire structure is considered to be small. Furthermore, the non-diamond phases distributed finely are considered to function as a buffer substance that mitigates impact. Each of the projected area equivalent circle diameters of the plurality of non-diamond phases is desirably not more than 1000 nm.

From the perspective of increasing the chipping resistance, a smaller average value of the projected area equivalent circle diameters of the non-diamond phases is more preferable. The average value of the projected area equivalent circle diameters of the non-diamond phases may be not more than 300 nm, not more than 100 nm, not more than 80 nm, or not more than 60 nm. From the perspective of the wear resistance, the average value of the projected area equivalent circle diameters of the non-diamond phases may be not less than 10 nm.

(Area Ratio)

In one surface obtained by polishing the composite polycrystal, a ratio of an area of the non-diamond phases to an area of the one surface (hereinafter may be denoted as "area ratio") is preferably not less than 0.5% and not more than 30%. The conditions described in the description of the projected area equivalent circle diameters can be used as the observation conditions (magnification and visual field range) of the SEM when measuring the area ratio.

The area of the non-diamond phases is determined as the total area of the dark field. The total area of the dark field can be determined in accordance with the above-described procedural steps (b) to (d) for measuring the projected area equivalent circle diameters. Then, the total area of the dark field is divided by an area of the entire visual field and the area ratio of the non-diamond phases can thus be calculated.

When the area ratio of the non-diamond phases is not less than 0.5%, an increase in chipping resistance can be expected. The area ratio is more preferably not less than 1%. When the area ratio is not more than 30%, an increase in wear resistance can be expected. The area ratio is more preferably not more than 26%, and further preferably not more than 20%.

<<Polycrystalline Diamond Phase>>

As shown in FIG. 1, polycrystalline diamond phase 11 forms a main phase of composite polycrystal 10. As described above, in the present embodiment, non-diamond phases 12 are distributed and isolated. In other words, polycrystalline diamond phase 11 serving as the main phase is continuous. FIG. 1 shows one surface obtained by polishing the composite polycrystal. In the present embodiment, when the polycrystalline diamond phase is continuous in the one surface, the polycrystalline diamond phase is regarded as being continuous three-dimensionally. When the polycrystalline diamond phase is continuous three-dimensionally, an increase in wear resistance can be expected.

The polycrystalline diamond phase includes a plurality of diamond particles. The diamond particles are single monocrystalline diamond. The monocrystalline diamond is preferably cubic diamond. The monocrystalline diamond may be hexagonal diamond. The existence of the individual diamond particles forming the polycrystalline diamond phase can be identified by adjusting the contrast of the SEM image.

(Average Value of Projected Area Equivalent Circle Diameters of Diamond Particles)

An average value of projected area equivalent circle diameters of the diamond particles is preferably not more than 1000 nm. The average value of the projected area equivalent circle diameters of the diamond particles can be measured in accordance with the following procedural steps (g) to (l).

(g) The contrast of the SEM image is adjusted to attain a state in which the individual diamond particles can be mutually recognized, i.e., grain boundaries can be distinguished.

(h) The number of diamond particles in a visual field is counted.

(i) As described above, binarization is performed on the image and pixels derived from a bright field are counted.

(j) The total number of pixels in the bright field is multiplied by an area per pixel to calculate a total area of the bright field.

(k) The total area of the bright field is divided by the number of diamond particles to calculate an average area per diamond particle.

(l) A diameter of a circle having an area equal to the average area is determined.

As the average value of the projected area equivalent circle diameters of the diamond particles becomes smaller, further increase in chipping resistance can be expected. The average value of the projected area equivalent circle diameters of the plurality of diamond particles may be not more than 500 nm, not more than 300 nm, not more than 150 nm, not more than 80 nm, or not more than 60 nm. From the perspective of the wear resistance, the average value of the projected area equivalent circle diameters of the diamond particles is preferably not less than 10 nm. The average value of the projected area equivalent circle diameters of the diamond particles may be not less than 30 nm.

<<Knoop Hardness>>

A Knoop hardness of the composite polycrystal of the present embodiment is preferably not less than 50 GPa. As the Knoop hardness becomes higher, the wear resistance of the composite polycrystal tends to increase. The Knoop hardness is more preferably not less than 60 GPa, further preferably not less than 70 GPa, and most preferably not less than 100 GPa. An upper limit of the Knoop hardness is not particularly limited. The Knoop hardness may be, for example, not more than 110 GPa.

The Knoop hardness is measured using a method compliant with "JIS Z 2251:2009 Knoop Hardness Test-Measurement Method". A common microhardness tester can be used for measurement of the Knoop hardness. A measurement environment may be room temperature (e.g., approximately 23° C.±5° C.). A Knoop-type indenter (having a rhomboid quadrangular pyramid shape) is used as an indenter. A material of the indenter is desirably monocrystalline diamond. A test force (load) is 4.9 N (0.5 kgf). The test force keeping time is 10 seconds. An indenter approach speed is 60 μm/s.

<<Applications of Composite Polycrystal>>

The composite polycrystal of the present embodiment exhibits an excellent chipping resistance. Therefore, the composite polycrystal is suitable for applications in which the resistance to impact and vibration is required, e.g., an excavating tool such as an excavating bit as well as a cutting tool such as a drill, an end mill, a throw away insert for turning, and a turning tool. Taking advantage of the wear resistance, the composite polycrystal may be used in a wear-resistant tool such as a die, a scriber, a scribing wheel, and a dresser. Alternatively, the composite polycrystal can also be used in a grinding tool such as a grinding grindstone. Namely, another form of the present embodiment may be an excavating tool, a cutting tool, a wear-resistant tool, or a grinding tool including the above-described composite polycrystal.

<Method for Manufacturing Composite Polycrystal>

The composite polycrystal (composite polycrystalline diamond) of the present embodiment is typically manufactured using the following manufacturing method.

Figure 3:
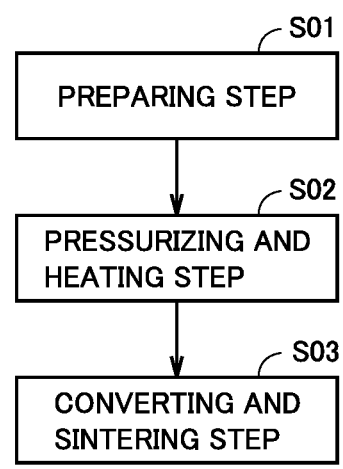
FIG. 3 is a flowchart showing the outline of a method for manufacturing the composite polycrystal according to one embodiment of the present disclosure.

FIG. 3 is a flowchart showing the outline of a method for manufacturing the composite polycrystal of the present embodiment. The manufacturing method includes a preparing step (S01), a pressurizing and heating step (S02), and a converting and sintering step (S03). The steps are performed in this order. The steps will be described below.

<<Preparing Step (S01)>>

In the preparing step, non-diamond carbon is prepared. The non-diamond carbon serving as a raw material (starting material) of the composite polycrystal may be, for example, graphite, glassy carbon, amorphous carbon (such as, for example, carbon black), fullerene (such as, for example, $C_{60}$), carbon nanotube and the like. The non-diamond carbon serving as the raw material is desirably graphite. When graphite is used, an increase in quality and purity of the composite polycrystal can be expected. A purity of graphite is preferably not less than 99 mass % and not more than 100 mass %, and more preferably not less than 99.5 mass % and not more than 100 mass %.

The non-diamond carbon serving as the raw material may be a powder or a molded material. The non-diamond carbon serving as the raw material is preferably a molded material composed of graphite particles (hereinafter also denoted as "graphite molded material"). When such graphite molded material is used, a dense composite polycrystal tends to be likely to occur. An average particle size of the graphite particles is preferably not less than 10 nm and not more than 5000 nm, and more preferably not less than 10 nm and not more than 1000 nm. "Average particle size" herein refers to a particle size at a cumulative total of 50% (also referred to as "d50" and "median size") in a volume-based particle size distribution measured by a laser diffraction and scattering method.

The graphite molded material can be manufactured, for example, by pressing and molding a powder of graphite particles. A shape of the molded material is desirably a shape to which pressure is likely to be applied isotropically. The shape of the molded material is, for example, a cylindrical shape, a cubic shape, a spherical shape and the like. A density of the graphite molded material may be adjusted to approximately 1.80 to 1.90 g/cm$^3$.

<<Pressurizing and Heating Step (S02)>>

The following step uses a high-temperature and high-pressure generating apparatus that can generate the high temperature state of not lower than 1800° C. and the high pressure state of not less than 9 GPa. Examples of the high-temperature and high-pressure generating apparatus include a belt-type apparatus, a cubic-type apparatus, a split sphere-type apparatus and the like. Any type of apparatus may be used as long as it can generate the above-described high-temperature and high-pressure state.

In the pressurizing and heating step, under certain conditions, pressurizing is performed to reach a sintering pressure and heating is performed to reach a sintering temperature.

Before the processing, the non-diamond carbon is encapsulated in a capsule made of a high melting point metal. Examples of the high melting point metal include tantalum (Ta), molybdenum (Mo), platinum (Pt), rhenium (Re) and the like. The capsule is arranged in a sample room of the high-temperature and high-pressure apparatus, and pressurizing and heating are performed. In the present embodiment, pressurizing and heating are performed to reach a target sintering pressure and sintering temperature under conditions satisfying all of the following equations (I) to (IV):

$$P \leq 0.0067T+1 \quad \text{(I)};$$

$$P \geq 0.0035T-0.3462 \quad \text{(II)};$$

$$0 \leq T \leq 2700 \quad \text{(III); and}$$

$$0 \leq P \leq 13 \quad \text{(IV)}$$

where P [GPa] represents a pressure and T [° C.] represents a temperature.

Figure 4:
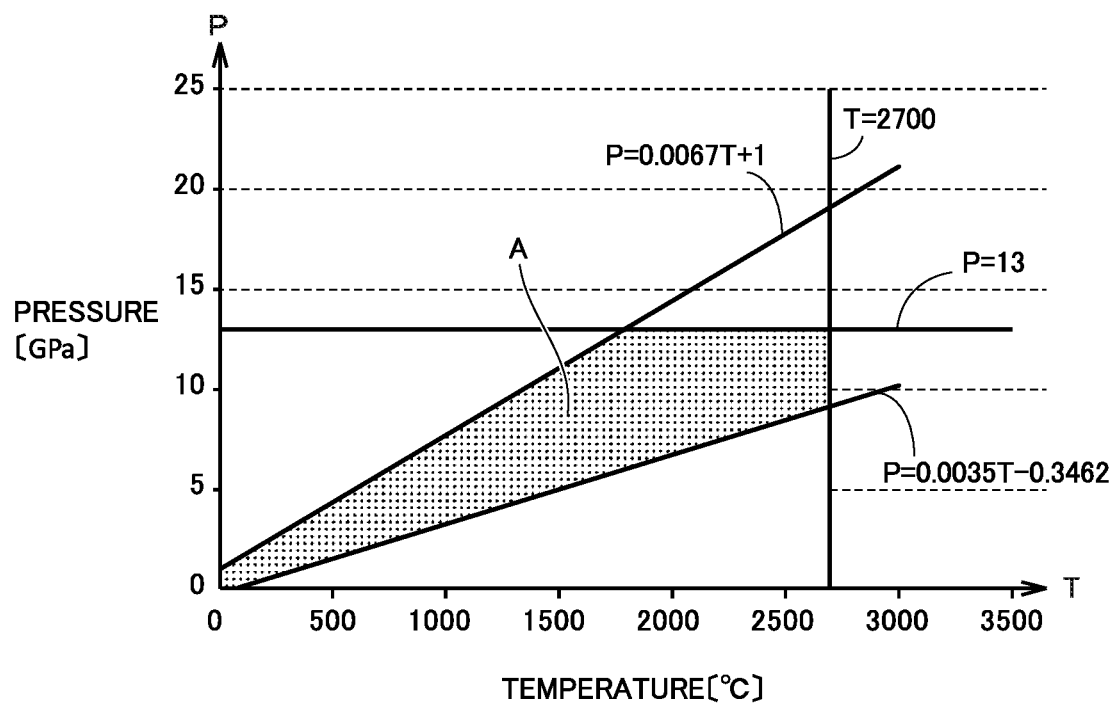
FIG. 4 is a graph for describing conditions for a pressurizing and heating step.

FIG. 4 is a graph for describing the conditions for the pressurizing and heating step. In the graph of FIG. 4, the vertical axis represents a pressure [GPa] and the horizontal axis represents a temperature [° C.]. A region A in the graph is a region that satisfies all of the above-described equations (I) to (IV).

When P and T enter a region that does not satisfy the above-described equation (I) (i.e., "P>0.0067T+1") during pressurizing and heating, phase transition from non-diamond carbon to diamond, which is mainly martensitic phase transition without atomic diffusion, progresses. As a result, in the generated composite polycrystal, the shape of the non-diamond phases is nonuniform and the distributed state of the non-diamond phases is also bad.

When P and T enter a region that does not satisfy the above-described equation (II) (i.e., "P<0.0035T−0.3462") during pressurizing and heating, the graphite phase becomes stable and thus a conversion efficiency from non-diamond carbon to diamond decreases. As a result, in the generated composite polycrystal, a coarse non-diamond phase is formed and the distributed state of the non-diamond phases is also bad.

Figure 2:
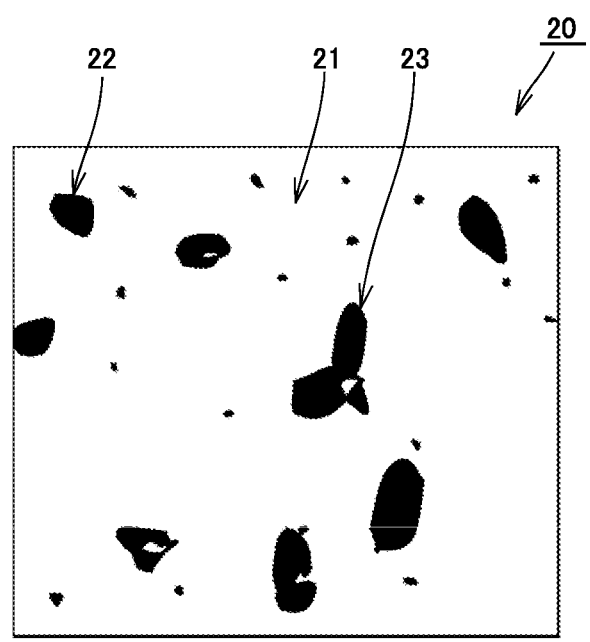
FIG. 2 is a schematic view showing a structure of a composite polycrystal according to a reference embodiment.

FIG. 2 is a schematic diagram showing a structure of a composite polycrystal according to a reference embodiment. A composite polycrystal 20 shown in FIG. 2 is manufactured under conditions that P and T fall outside region A during heating and pressurizing as described above. Composite polycrystal 20 includes a coarse non-diamond phase 22 and a non-diamond phase 23 in which a plurality of non-diamond phases aggregate and connect to each other. In addition, the distributed state of the non-diamond phases in a polycrystalline diamond phase 21 is not uniform. In such a structure, non-diamond phases 22 and 23 are likely to serve as a starting point of breaking, and thus, chipping is likely to occur.

<<Converting and Sintering Step (S03)>>

In the converting and sintering step, the non-diamond carbon is kept at the sintering pressure and the sintering temperature, and thus, a part of the non-diamond carbon is converted to polycrystalline diamond, and the non-diamond carbon and the polycrystalline diamond are sintered, to manufacture the composite polycrystal.

In the present embodiment, the sintering pressure is not less than 9 GPa and not more than 13 GPa, and the sintering temperature is not lower than 1800° C. and not higher than 2700° C. Conversion and sintering under these conditions allow efficient generation of the polycrystalline diamond phase.

From the perspective of the conversion efficiency, the sintering pressure may be not less than 10 GPa, and may be not more than 12 GPa. In addition, the sintering temperature may be not lower than 1900° C., or may be not lower than 2200° C. The sintering temperature may be not higher than 2600° C., or may be not higher than 2400° C.

The keeping time of the sintering pressure and the sintering temperature is, for example, approximately not shorter than 5 minutes and not longer than 2 hours, and preferably approximately not shorter than 10 minutes and not longer than 1 hour, and more preferably approximately not shorter than 10 minutes and not longer than 30 minutes.

By performing the above-described steps, the composite polycrystal of the present embodiment can be manufactured.

EXAMPLES

Although the present embodiment will be described with reference to Examples, the present embodiment is not limited to the following Examples.

<Manufacturing of Composite Polycrystal>

Composite polycrystals (composite polycrystalline diamonds) according to Sample No. 1 to Sample No. 6 were manufactured as described below. Sample No. 1 to Sample No. 4 correspond to Examples, and Sample No. 5 and Sample No. 6 correspond to Comparative Examples.

<<Sample No. 1>>

1. Preparing Step (S01)

A powder of graphite particles having a particle size range of 100 to 3000 nm was pressed and molded, to manufacture a graphite molded material (density: 1.85 g/cm³, purity: 99.5 mass %). Non-diamond carbon which was a starting material was thus prepared.

2. Pressurizing and Heating Step (S02)

The graphite molded material was put into a capsule made of a high melting point metal, and the capsule was arranged in the sample room of the high-temperature and high-pressure apparatus. Under the conditions belonging to region A in FIG. 4, pressurizing was performed to reach 9 GPa and heating was performed to reach 2600° C.

3. Converting and Sintering Step (S03) The non-diamond carbon was kept at 9 GPa (sintering pressure) and 2600° C. (sintering temperature) for 20 minutes, and thus, a part of the non-diamond carbon was converted to polycrystalline diamond, and the non-diamond carbon and the polycrystalline diamond were sintered. A composite polycrystal according to Sample No. 1 was thus manufactured.

<<Sample No. 2 to Sample No. 4>>

Similarly to Sample No. 1, each of Sample No. 2 to Sample No. 4 was manufactured except that pressurizing and heating were performed to reach the sintering pressure and the sintering temperature shown in the "Converting and sintering step" column in Table 1 under the conditions belonging to region A in FIG. 4 in the pressurizing and heating step, and these sintering pressure and sintering temperature were kept in the converting and sintering step, to manufacture a composite polycrystal.

TABLE 1

| | Manufacturing method | | | | | Composite polycrystal | | | | |
| | | | | | | Polycrystalline diamond phase | Non-diamond phases | | | |
| | Preparing step Raw material (starting material) non-diamond carbon | Pressurizing and heating step | | Converting and sintering step | | diamond particles Equivalent circle diameter (average value) nm | Area ratio % | Equivalent circle diameter (average value) nm | Knoop hardness GPa | Cutting tool Cutting test cutting length = 10 km |
| No. | | Pressure P GPa | Temperature T °C. | Sintering pressure GPa | Sintering temperature °C. | | | | | |
| 1 | graphite molded material | within region A in FIG. 4 | | 9 | 2600 | 300 | 26 | 800 | 65-75 | no chipping |
| 2 | graphite molded material | within region A in FIG. 4 | | 12 | 2400 | 150 | 1 | 60 | 100-110 | no chipping |
| 3 | graphite molded material | within region A in FIG. 4 | | 13 | 1900 | 60 | 30 | 80 | 55-65 | no chipping |
| 4 | graphite molded material | within region A in FIG. 4 | | 10 | 2200 | 80 | 20 | 300 | 70-80 | no chipping |
| 5 | graphite molded material | outside region A in FIG. 4 (upper side of region A) | | 10 | 2200 | 83 | 21 | 1400 | 45-80 | chipping (cutting length = 3 km) |
| 6 | graphite molded material | outside region A in FIG. 4 (lower side of region A) | | 10 | 2200 | 85 | 23 | 1900 | 45-80 | chipping (cutting length = 2 km) |

<<Sample No. 5>>

Similarly to Sample No. 1, Sample No. 5 was manufactured except that pressurizing was performed to reach 10 GPa (sintering pressure) and heating was performed to reach 1000° C. (sintering temperature) in the pressurizing and heating step, and these sintering pressure and sintering temperature were kept in the converting and sintering step, to manufacture a composite polycrystal.

Sample No. 5 corresponds to an example in which the pressurizing and heating step was performed under the conditions that do not satisfy the above-described equation (I) of "P≤0.0067T+1". In FIG. 4, the conditions for Sample No. 5 belong to a region located on the upper side of region A.

<<Sample No. 6>>

Similarly to Sample No. 1, Sample No. 6 was manufactured except that pressurizing was first performed to reach 6 GPa and heating was performed to reach 2200° C. (sintering temperature) and then pressurizing was performed to reach 10 GPa (sintering pressure) in the pressurizing and heating step, and these sintering pressure and sintering temperature were kept in the converting and sintering step, to manufacture a composite polycrystal.

As for Sample No. 6, although the final sintering pressure and sintering temperature were within region A, the pressure and the temperature temporarily fell outside region A in the course of pressurizing and heating. Namely, when pressurizing and heating were performed to reach 6 GPa and 2200° C., the above-described equation (II) of "P≥0035T−0.3462" was not satisfied. In FIG. 4, the conditions of P=6 GPa and T=2200° C. belong to a region located on the lower side of region A.

<Evaluation>

The samples were evaluated as described below.

1. Area Ratio of Non-Diamond Phases

Each sample was polished to expose a clean surface. Observation with the SEM was performed at separate three positions of the surface, to identify a polycrystalline diamond phase (bright field) and non-diamond phases (dark field). In accordance with the above-described procedure, an area ratio of the non-diamond phases was calculated. The result is shown in Table 1. Conditions for the SEM were set as described below.

(SEM Conditions)

Observation magnification: 10000×

Visual field range: rectangular range of 9 μm in length×12 μm in width

2. Projected Area Equivalent Circle Diameter

In accordance with the above-described procedure, an average value of projected area equivalent circle diameters of the non-diamond phases and an average value of projected area equivalent circle diameters of the diamond particles were calculated. The result is shown in Table 1. In Table 1, the average value of the projected area equivalent circle diameters is abbreviated as "Equivalent circle diameter (average value)".

3. Knoop Hardness

A Knoop hardness of each sample was measured under the following conditions. The measurement was performed a plurality of times. The result is shown in Table 1. "65-75" or the like shown in the "Knoop hardness" column in Table 1 indicates that the minimum value is 65 GPa and the maximum value is 75 GPa in the plurality of times of measurement. It is conceivable that as the Knoop hardness becomes higher, the wear resistance becomes better.

(Conditions for Measurement of Knoop Hardness)

Indenter: Knoop-type indenter (material: IIa-type diamond, shape: rhomboid quadrangular pyramid shape)

Test force: 4.9 N

Test force keeping time: 10 seconds

Indenter approach speed: 60 μm/s

4. Cutting Test

Each sample was processed into a tip for cutting work. Using the tip for cutting work, a cutting test was performed under the following conditions, to evaluate the chipping resistance. The cutting conditions are based on the assumption that impact would be applied to the tool during cutting work. The result is shown in Table 1.

(Cutting Conditions)

Cutting method: wet cutting

Workpiece: round bar of aluminum alloy A390 (having four V-shaped grooves)
Cutting speed: 800 m/min
Depth of cut: 0.2 mm
Feed: 0.1 mm/rev
Cutting length: 10 km <Result and Consideration>

As shown in Table 1, in Sample No. 5 and Sample No. 6, the average value of the projected area equivalent circle diameters of the non-diamond phases exceeded 1000 nm. In addition, variations in size of the non-diamond phases were great, and the minute non-diamond phases having the projected area equivalent circle diameters of approximately 100 nm and the coarse non-diamond phases having the projected area equivalent circle diameters of approximately 4000 to 5000 nm were mixedly present. Namely, the range of the projected area equivalent circle diameters was 100 to 4000 nm in Sample No. 5, and was 100 to 5000 nm in Sample No. 6. Furthermore, a connected portion of a plurality of non-diamond phases was also found in the coarse non-diamond phases.

In the cutting test, in Sample No. 5, a cutting edge of the tool became chipped significantly when the cutting length was 3 km. In Sample No. 6 as well, a cutting edge of the tool became chipped significantly when the cutting length was 2 km.

As shown in Table 1, in Sample No. 1 to Sample No. 4, the average value of the projected area equivalent circle diameters of the non-diamond phases was not more than 1000 nm. As a result of observation of the structures of Sample No. 1 to Sample No. 4, it was confirmed that the non-diamond phases were distributed in the polycrystalline diamond phase. In the cutting test, Sample No. 1 to Sample No. 4 could be cut over the cutting length of 10 km without chipping. Namely, Sample No. 1 to Sample No. 4 had an increased chipping resistance as compared with Sample No. 5 and Sample No. 6.

The Knoop hardness of each of Sample No. 1 to Sample No. 4 was not less than 50 GPa. In addition, in Sample No. 1 to Sample No. 4, variations in Knoop hardness (difference between the maximum value and the minimum value) were small, i.e., approximately 10 GPa. Therefore, it is conceivable that Sample No. 1 to Sample No. 4 also have an excellent wear resistance.

In Sample No. 1 to Sample No. 4, it was confirmed that as the area ratio of the non-diamond phases became lower, the Knoop hardness became higher. It can be seen from Table 1 that the Knoop hardness of the composite polycrystal according to the present embodiment may be not less than 60 GPa, or may be not less than 70 GPa, or may be not less than 100 GPa.

The variations in Knoop hardness of Sample No. 5 and Sample No. 6 were approximately 30 to 35 GPa, which was greater than those of Sample No. 1 to Sample No. 4. This is considered to be because the dispersibility of the non-diamond phases is low.

Although the embodiment and examples of the present disclosure have been described above, it is also originally intended to combine as appropriate or variously modify the features of the embodiment and examples described above.

It should be understood that the embodiment and examples disclosed herein are illustrative and non-restrictive in every respect. The scope of the present disclosure is defined by the terms of the claims, rather than the embodiment and examples described above, and is intended to include any modifications within the scope and meaning equivalent to the claims.

REFERENCE SIGNS LIST 10, 20 composite polycrystal; 11, 21 polycrystalline diamond phase; 12, 22, 23 non-diamond phase; A region.

The invention claimed is:

1. A composite polycrystal comprising:
a polycrystalline diamond phase including a plurality of diamond particles; and
non-diamond phases composed of non-diamond carbon,
the non-diamond phases being distributed in the polycrystalline diamond phase,
an average value of projected area equivalent circle diameters of the non-diamond phases being not more than 100 nm,
wherein the composite polycrystal is a sintered material.

2. The composite polycrystal according to claim 1, wherein
an average value of projected area equivalent circle diameters of the diamond particles is not more than 1000 nm.

3. The composite polycrystal according to claim 1, wherein
a Knoop hardness of the composite polycrystal is not less than 50 GPa.

4. A composite polycrystal comprising:
a polycrystalline diamond phase including a plurality of diamond particles; and
non-diamond phases composed of non-diamond carbon,
the non-diamond phases being distributed in the polycrystalline diamond phase,
an average value of projected area equivalent circle diameters of the non-diamond phases being not more than 1000 nm,
an average value of projected area equivalent circle diameters of the diamond particles being not more than 100 nm,
a Knoop hardness of the composite polycrystal being not less than 50 GPa,
wherein the composite polycrystal is a sintered material.

5. A composite polycrystal comprising:
a polycrystalline diamond phase including a plurality of diamond particles; and
non-diamond phases composed of non-diamond carbon,
the non-diamond phases being distributed in the polycrystalline diamond phase,
an average value of projected area equivalent circle diameters of the non-diamond phases being not more than 1000 nm,
wherein the composite polycrystal is a sintered material, and
wherein the composite polycrystal is manufactured under a condition satisfying all of following equations (I) to (IV):

$$P \leq 0.0067T + 1 \qquad (I);$$

$$P \geq 0.0035T - 0.3462 \qquad (II);$$

$$0 \leq T \leq 2700 \qquad (III); \text{ and}$$

$$0 \leq P \leq 13 \qquad (IV)$$

where P [GPa] represents a sintering pressure and T [° C.] represents a sintering temperature,
the sintering pressure being not less than 9 GPa and not more than 13 GPa, and the sintering temperature being not lower than 1800° C. and not higher than 2700° C.

* * * * *